United States Patent [19]

Walters

[11] Patent Number: 4,641,859
[45] Date of Patent: Feb. 10, 1987

[54] COUPLING HAVING SPRING BIASED LOCKING MEANS

[76] Inventor: Tom Walters, 2102 Mason Blvd., Point Pleasant, W. Va. 25550

[21] Appl. No.: 839,224

[22] Filed: Mar. 13, 1986

[51] Int. Cl.⁴ .............................................. F16L 37/12
[52] U.S. Cl. ...................... 285/27; 285/281; 285/308; 285/317; 285/351
[58] Field of Search ..................... 285/317, 7, 308, 27, 285/351, 281

[56] References Cited

U.S. PATENT DOCUMENTS

| 593,190 | 11/1897 | Bernhardt | 285/317 |
| 2,520,215 | 8/1950 | Kerr | 285/317 X |
| 3,342,510 | 9/1967 | Walters | 285/83 X |
| 3,922,011 | 11/1975 | Walters | 285/315 X |
| 4,039,213 | 8/1977 | Walters | 285/317 |
| 4,487,437 | 12/1984 | Dickirson | 285/351 X |

Primary Examiner—Thomas F. Callaghan

[57] ABSTRACT

A coupling unit of tubular overlapping conduits that are swivelly coupled to each other and are locked together by a spring loaded hook type rocker arm member centrally hinged upon a boss on the outer overlapping conduit. The rocker arm member has an inward hook at one end and an outward spring member guide push button on the opposite end. The hook end is normally maintained radially inward through an aperature in the outer conduit and the push button is normally positioned radially outward to protrude through an aperature in a protective cover closure bonnet. The hook end of the rocker arm member cooperates with a hook and groove formation on the inner conduit to lock the inner and outer conduits together.

34 Claims, 10 Drawing Figures

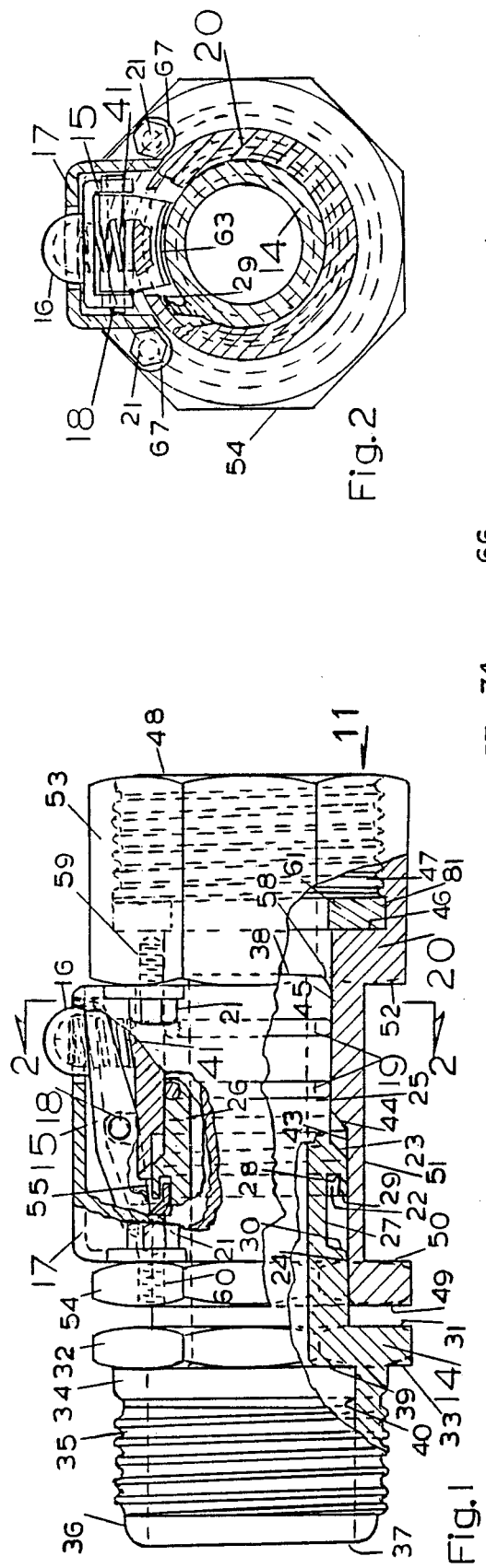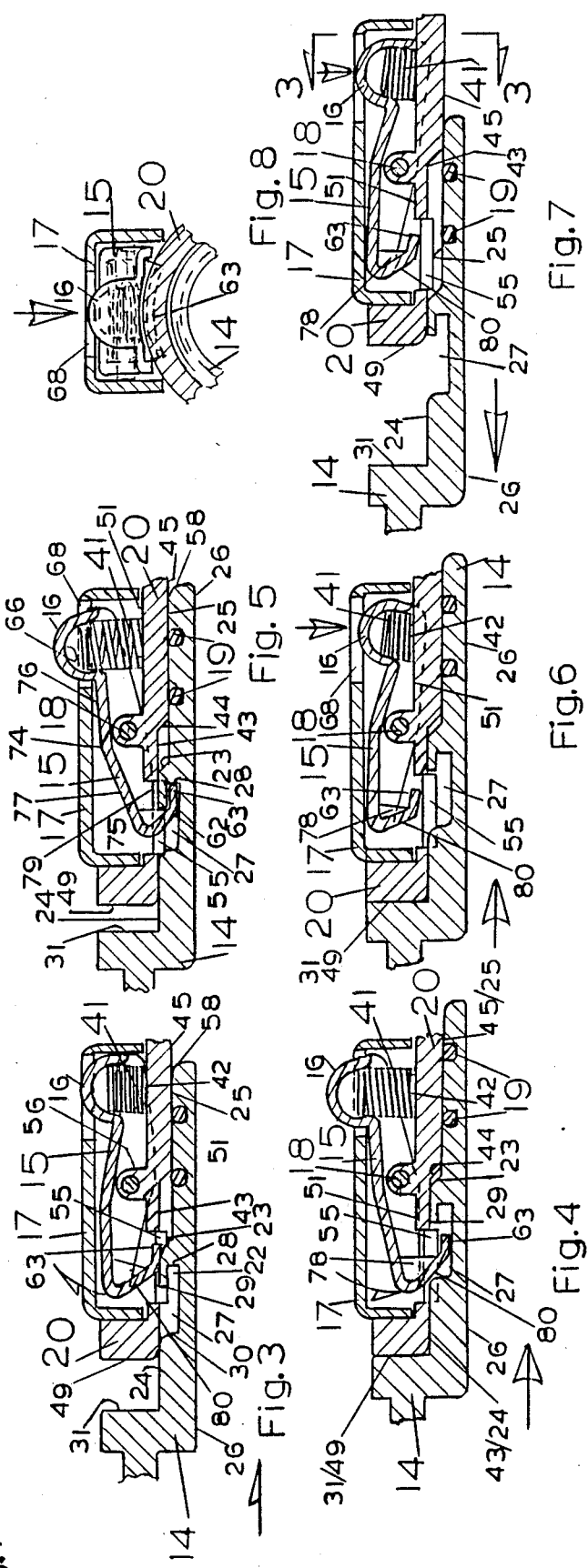

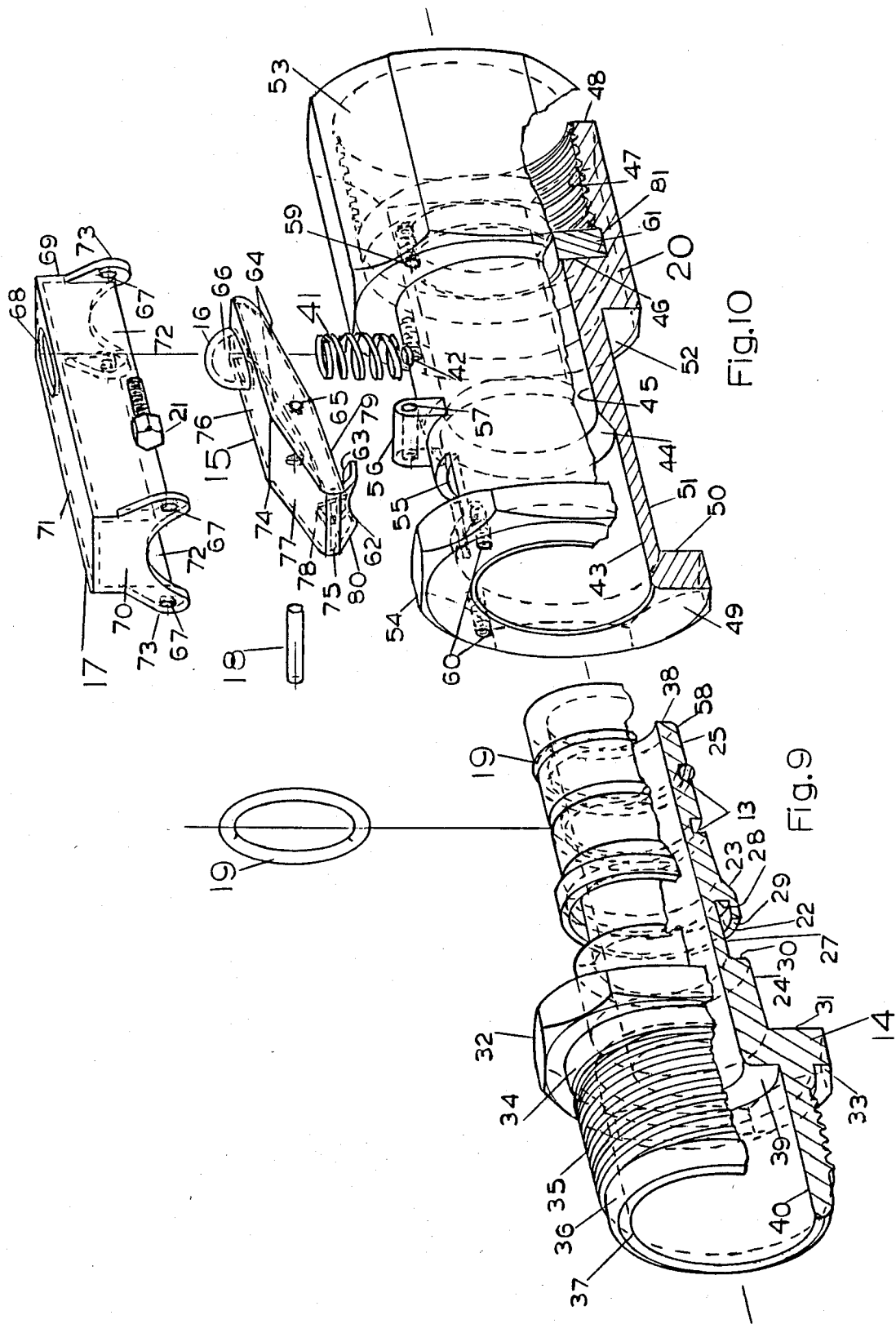

COUPLING HAVING SPRING BIASED LOCKING MEANS

This invention relates in general to the coupling of tubular conduits and more particularly to a new safely dependable useful coupling assembly adapted to quickly and reliably couple and uncouple hose sections such as garden hose, irrigation systems, hose nozzles, fire hose and related services wherein pressurized fluid is conducted and be pressure locked by the internal axial directed column end force of the pressurized fluid being conducted within the coupled assembly.

Present screw type and sleeve operated coupling assemblies for said usages can be uncoupled while containing and while conducting pressurized fluid prsenting undesirable conditions and often hazardous.

It is therefore, an important object of the present invention to provide a coupling assembly embodying a simple rugged safety featuring design that has automatic sealing upon the automatic mechanical couple lock and has automatic pressure sealing and pressure locking features when conducting pressurized fluid. Further, to provide a design that automatically positions the couple parts of one member that upon the straight thrust insertion of the other member the two members are automatically axially locked together in a manner the couple configurations provide a full swivel of said members about a common axis to aid in eliminating hose kinks. More important, to provide a push button uncoupling operation with safety features preventing uncoupling the unit when appreciable pressure within the assembly is present.

In accordance with the present invention, a female coupling member is provided with an outward hinge boss to hinge a rocker arm coupling member that has an outward semi-spherical button one end that has an inner socket that partially receives and guides the outer end of a compression spring coupling member and the inner end of said spring is positioned around a guide boss of said female member. The opposite end of said rocker arm has bevelled configurations leading inward to a hook configuration that passes through an aperture in said female member to subsequently engage an annular hook and groove formation of the male coupling member. Said push button protrudes radially outward through an aperture in a closure bonnet coupling member affixed to said female member. The female member with the above said members positioned as noted represents the automatic cocked state of the female member as a unit ready for the couple sequence.

The male member with seal elements secured may then be inserted into the female coupling unit and be automatically sealed and locked in a coupled position by its hook and groove formation as it engages the rocker arm hook configuration. The thrust force of inserting said male member into the receiving chamber of the female member wedgingly pushes the end of the rocker arm hook radially outward against the bias of said spring member until said male member hook and groove formation passes under said rocker arm hook. Then said spring member force returns the rocker arm hook end back into the female member aperture to lock position axially opposed to the hook and groove formation of the male member providing the positioning of couple parts for the interlocking engagement.

Accordingly, when pressurized fluid is within the coupled assembly the related column end force will axially separate said assembly in a desirable limited manner that causes a firm interlocking engagement of said couple parts that prevents pushing the uncouple button radially inward to uncouple the coupled assembly. In this manner a reliable pressure locked couple is provided along with a push button uncouple procedure with the safety feature of said push button being functional to uncouple when appreciable internal pressure is absent and the male member can then be further inserted into the female member to disengage the interlocking engagement and said button can be pushed radially inward moving the hook configuration of said rocker arm radially outward to permit withdrawal of the male member in an uncoupling manner.

These together with other objects and advantages which will become subsequently apparent reside in the details of construction and operations more fully hereinafter described and claimed, reference being had to the accompanying drawings forming a part hereof, wherein like numerals refer to like parts throughout.

FIG. 1 is a side view, partly in section, showing the assembled parts of the present invention.

FIG. 2 is an end sectional view taken substantially through a plane indicated by section line 2—2 in FIG. 1 showing the assembled parts.

FIGS. 3, 4 and 5 are partial side sectional views showing the coupling assembly in different stages of coupling.

FIGS. 6 and 7 are partial side sectional views showing the coupling assembly in different stages of uncoupling.

FIG. 8 is a partial end sectional view taken substantially through a plane indicated by section line 3—3 in FIG. 7.

FIG. 9 is an exploded view, partly in section, of coupling members 14 and 19.

FIG. 10 is an exploded view, partly in section, of coupling members 15, 17, 18, 20 and 41.

Referring now to the drawings in detail, FIGS. 1, 2, 9 and 10 show a typical coupling assembly 11 constructed in accordance with the present invention. The female tubular coupling member 20 and a male tubular coupling member 14 have threads 47 and 35 respectively as attachment ends for adjacent conduit sections. The female coupling member 20 has attachment threads 47 beginning at end 48 leading to a radially outward annular recess that receives gasket 61 that abuts shoulder 46 that leads radially inward and begins internal cylindrical sealing surface 45 which leads to bevelled shoulder 44 that opens to cylindrical guide and receiving chamber 43 ending at abutment end 49 that has wrench fit octagonal surface 54. End 48 leads radially outward to wrench fit octagonal surface 53 that begins the outer periphery of member 20 leading to shoulder 52 that leads to cylindrical surface 51 that has spring guide boss 42 to receive the inner end of coupling spring member 41. Hinge boss 56 on surface 51 has hole 57 for hinging rocker arm coupling member 15 with hinge pin coupling member 18. Said surface 51 has aperture 55 then ends at shoulder 50 which leads radially outward to wrench fit octagonal surface 54.

Rocker arm coupling member 15 outer periphery begins with surface 76 that has a radially outward semi-spherical button 16 which has an inner socket 66 to partially receive and guide said coupling spring member 41. Surface 76 then leads to knuckle 74 which leads angularly inward on surface 77 that leads to radial knuckle end 75 which leads further inward on bevel 80 to radial knuckle surface 62 that extends back under to radial hook 63. Bracket plate 78 is affixed to the inner surfaces of surfaces 77, 75, 80 and 62 to strengthen radial hook 63. Said rocker arm member 15 has sides 64 with holes 65 to receive said hinge pin member 18 and abutment edges 79 to abut surface 51 of member 20 to limit the radial inward swing of said rocker arm member 15.

Protective closure bonnet coupling member 17 outer periphery has ends 69 and 70 affixed to sides 72 and top 71 wherein ends 69 and 70 have side lugs 73 with holes 67 that receive screws 21 for attachment of said bonnet 17 to sholders 50 and 52 of female member 20 with screws 21 in tapped holes 59 and 60 of shoulders 52 and 50 respectively. Said surface 71 has aperture 68 that receives said button 16 of rocker arm member 15 upon assembly.

The male coupling member 14 has end 38 leading inward to internal cylindrical flow area 26 that leads to shoulder 39 that enlarges to flow receiving chamber 40 that leads to end 37. End 38 leads radially outward to annular radial configuration 58 that upon the couple action begins the radially outward wedging of said rocker arm 15 by contacting bevel 80 of said hook configuration. Said radial configuration 58 leads to cylindrical surface 25 which begins the outer periphery of member 14 leading to grooves 13 that receive coupling member O-ring seal elements 19. Said surface 25 leads on to an outward annular hook and groove formation at bevel 23 that leads to cylindrical guide surface 24 that has an annular radially inward recess 27 with groove 22 with end 28 and hook 29 one end and shoulder 30 the opposite end that leads radially outward back to surface 24 that ends at abutment shoulder 31. Shoulder 31 leads radially outward to wrench fit octagonal surface 32 that leads to shoulder 33 that leads radially inward to cylindrical surface 34 that leads to attachment threads 35 that leads radially inward to annular radial configuration 36 at end 37 to receive standard female hose connection and the like.

With the female coupling member assembled complete with coupling members 15, 17, 18 and 41 positioned as previously explained and further shown in FIGS. 3, 4 and 5 which show the couple action in different stages of coupling when male coupling member 14 is slidably inserted into guide and receiving chamber 43 of female member 20, said female assembly is prepared as a unit in the automatic cocked position for the following couple actions. Upon said insertion of coupling member 14 annular radial configuration 58 initially then bevelled shoulder 23 of member 14 wedgingly contact and move bevel 80 of rocker arm member 15 radially outward against the bias of said spring member 41 so cylindrical surface 24 of member 14 passes under said rocker arm radial hook 63 and as hook 29 of member 14 passes by said hook 63 of member 15 the reacting force of said spring member 41 positions said hook 63 radially inward into annular recess 27 of member 14 and positioned for the interlocked couple engagement of members 14 and 20 representing the automatic mechanical lock and sealed position of coupling members as shown in FIG. 4.

The use of multiple O-ring seal elements provide radial centering of the axial alignment of the male member 14 with the female member 20 to provide a dependable seal design.

When the coupled unit contains pressurized fluid the inherent column end force tends to axially separate members 14 and 20 one from the other which positions said hook 63 into said groove 22 and be radially maintained therein by hook 29 of member 14 providing a tightened interlocked engagement of the couple parts as shown in FIG. 5 representing the pressure locked and sealed coupled safety feature of the present invention wherein said tightened interlocked engagement of the coupled parts prohibits the radial inward movement of said button 16 of rocker arm member 15 in an inadvertent attempt to uncouple the assembled unit containing appreciable pressurized fluid.

To uncouple the assembled unit when the internal pressure is removed as indicated in FIG. 6 that shows the male coupling member 14 further inserted into chamber 45 of the female coupling member 20 to where hook 29 of member 14 and radial hook 63 of the rocker arm member 15 are free of the interlocking engagement then button 16 of member 15 is manually pushed radially inward against the bias of spring member 41 wherein due to the hinging action of rocker arm member 15 hook configuration 63 is moved radially outward in a manner that permits the uncouple withdrawal of the male coupling member 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a pair of axially overlapping conduit members with O-ring seal elements groove seated on the inner member at the seal area in an interference fit between the members wherein said conduit members are adapted to be rotatable relative to each other about a common axis, a coupling assembly notably with conduit attachment ends, wherein the outer member with an outwardly axially directed centrally hinged rocker arm member with desirable low compact design comprising a raised button with an inner socket that partially receives and guides a compression spring member inwardly positioned between said button and over a guide boss on an outer surface of said outer member and a hook configuration on the opposite end of said rocker arm member, wherein said hook configuration normally protrudes radially inward through an aperture in said outer member to subsequently engage a radially outward annular hook and groove within an inward annular recess formation of the inner member upon the couple action, wherein said rocker arm member is capped by a closure bonnet member with an access aperture for said button radial swing passage wherein with the above noted attachments to the outer member represents said outer member assembly as a unit, whereupon during the couple action as said inner member appropriate end is axially inserted in any manner into the relatively lengthy guide and seal element receiving chambers of said outer member the hook configuration of said rocker arm member is initially moved radially outward as annular radial configuration end of the inner member wedgingly contacts a bevel on said hook configuration as annular bevel at seal chamber in said outer member and annular bevel at said hook and groove formation of said inner member radially center said inner member into an axial alignment with the outer member, then said hook configuration moves further radially outward against the bias of said spring member as a radially outward bevel on said annular hook and groove formation on said inner member wedgingly contacts said bevel on said hook configuration of the rocker arm member until said hook of said inner member passes under and past said hook configuration, whereupon the radially outward reacting force of said spring member at button end of the rocker arm member positions said hook configuration radially inward into said annular recess of said hook and groove formation of the inner member to an appropriate abutment and positioned for the interlock engagement of the hook of the hook configuration with said hook and groove formation representing the mechanical couple action and positioning of couple parts of the coupling assembly in a mechanically coupled state, whereupon as pressurized fluid is subsequently introduced within the coupled assembly the related column end force tends to axially separate the coupled members one from the other to cause said hook configuration of said rocker arm member hinged to the outer member to move in the desirable direction into a positive interlocked engagement with said annular groove and be radially retained therein by said hook of said hook and groove formation of the inner member representing the coupled parts in the automatic pressure lock positions when the coupled assembly is in the pressure locked coupled state, whereupon uncoupling the conduit members is accomplished when pressurized fluid is absent within the coupled assembly and the inner member is further inserted into the outer member to where appropriate surfaces abut at which time the hook configuration of said rocker arm member is free of the interlocking engagement the button of said rocker arm member is manually pushed radially inward against the bias of said spring member which action due to said rocker arm member hinging arrangement at hinge pin member in hinge boss of the outer member causes said hook configuration to swing radially outward into said closure bonnet member inner chamber and out of the interlocking engagement area to permit the withdrawal of the inner member at uncoupling the assembly, whereupon the manual release of said button the reaction force of said spring member returns said button radially outward and said hook configuration of rocker arm member radially inward and automatically positioned in the automatic cocked position for future couple actions.

2. The combination of claim 1 wherein said hinged rocker arm member includes a raised button that provides the manual push button means for the uncouple action of the coupled assembly.

3. The combination of claim 1 wherein said hinged rocker arm member includes a hook configuration that provides the automatic couple engagement for the outer member.

4. The combination of claim 1 wherein said hinged rocker arm member includes a bevel at said hook configuration that provides radially wedging movement for said hook configuration at couple action.

5. The combination of claim 1 wherein said hinged rocker arm member includes the configurations of a desirable low compact design that provides a low profile of the mechanism relative to the attachment end configurations.

6. The combination of claim 1 wherein said hinged rocker arm member includes a hook configuration that when the coupled assembly is in the pressure locked state prohibits the radial inward swing movement of the push button of said rocker arm member.

7. The combination of claim 1 wherein said axially directed centrally hinged rocker arm member includes a hinging arrangement on said outer member that provides a positive alignment of couple parts upon the couple action.

8. The combination of claim 1 wherein said hinged rocker arm member includes a hinging arrangement on said outer member that provides a positive radially outward swing action of the couple hook of said rocker arm at uncouple procedures.

9. The combination of claim 1 wherein said hinged rocker arm member includes partially containing the compression spring member at button end of said rocker arm member said spring with inherent compressibility and reaction thereto as made use of in the rocker arm member mechanism said mechanism automatically permits the radially outward and provides the radially inward movements respectively of said hook configuration on opposite end of said rocker arm member at couple procedures.

10. The combination of claim 1 wherein said hinged rocker arm member includes the configurations to provide a positive means for assembling upon the outer member with a hinge pin member.

11. The combination of claim 1 wherein said inner member includes an annular radial configuration that provides the initial radially outward wedging movement of the hook configuration of said rocker arm member at the couple action.

12. The combination of claim 1 wherein said inner member includes a bevel on the annular outward hook and groove formation that provides the secondary radially outward wedging of the hook configuration of said rocker arm member at the couple action.

13. The combination of claim 1 wherein said inner member includes an annular recess of the hook and groove formation that receives said hook configuration of the rocker arm member and permits a full radial swivel of said hook and the related outer member of the assembly in a coupled state.

14. The combination of claim 1 wherein said inner member includes an annular groove of the hook and groove formation that receives said hook of the hook configuration of rocker arm member that permits a full radial swivel of said hook configuration and the related outer member of the assembly in a coupled state.

15. The combination of claim 1 wherein said inner member includes an annular hook of the hook and groove formation that engagingly interlocks with said hook of hook configuration of rocker arm member in a member that permits a full radial swivel of said outer member of the assembly in a coupled state.

16. The combination of claim 1 wherein said outer member includes a spring guide boss that provides a positive position of said spring member at one end.

17. The combination of claim 1 wherein said outer member includes a hinge boss with guide ends that provide central alignment of said rocker arm member in a plane through the outer member axis.

18. The combination of claim 1 wherein said outer member includes an aperture that provides radially inward and outward passage of hook configuration of said rocker arm member.

19. The combination of claim 1 wherein said coupling assembly with conduit attachment ends that have useful configurations that include outer peripheries that protect the assembly at abusive handling.

20. The combination of claim 1 wherein said outer member includes relatively lengthy guide and seal element receiving chambers that provide adequate axially directed guide and seal areas for receiving said inner member in a manner that minimizes gyrating forces upon the coupled assembly.

21. The combination of claim 1 wherein said outer member includes an annular bevel at seal chamber that upon said couple insertion radially centers the leading end of said inner member into an axial alignment with said outer member.

22. The combination of claim 1 wherein said inner member includes an annular bevel at said hook and groove formation that upon said couple insertion radially centers the central body of said inner member into an axial alignment with said outer member.

23. The combination of claim 1 wherein said rocker arm member includes being capped by a closure bonnet member that provides a protective cover for said rocker arm mechanism of the outer member.

24. The combination of claim 1 wherein said outer member assembly represented as a unit that includes the attachment of said hinged rocker arm member and said spring member and capped with said closure bonnet provide the automatic cocked positions of couple parts of said outer member assembly as a unit.

25. The combination of claim 1 wherein said coupling assembly representing the mechanical couple action that includes the positiong of couple parts in a coupled state provides the automatic mechanical couple action feature.

26. The combination of claim 1 wherein said coupling assembly is in a mechanically coupled state that includes couple parts being positioned for the interlocking engagement of said couple parts which prevents an inadvertent attempt to pull the members apart such as dragging the hose assembly during maneuvering when pressurized fluid is absent within the coupling assembly since a slight axial pull will cause the interlocking couple parts to engage into a coupled lock.

27. The combination of claim 1 wherein said coupling assembly is in the mechanically coupled state that includes the position of interlocking engaging couple parts which provide the automatic pressure locked feature of the coupled assembly when pressurized fluid with related column end force is introduced therein causing a firm engagement of said couple parts as said column end force reacts axially in a separating manner upon the coupling assembly.

28. The combination of claim 1 wherein said coupling assembly is in the pressure locked coupled state that includes the interlocked engagement of couple parts wherein said engagement provides a positive axial lock of the coupling assembly in one desirable direction.

29. The combination of claim 1 wherein said coupling assembly is in the pressure locked coupled state that includes the interlocked engagement of couple parts wherein said couple parts include the configurations that permit further axial tightening of said engagement as the pressure and related column end force of contained pressurized fluid is increased.

30. The combination of claim 1 wherein said coupling assembly is in the pressure locked coupled state that includes the interlocked engagement of couple parts wherein said couple parts include the configurations that provide a positive engagement during abusive usage such as the push button being stepped on and when said button is jammed against an object while dragging hose sections in maneuvering the nozzle end.

31. The combination of claim 1 wherein said O-ring seal elements groove seated on the inner member at seal area in an interference fit between the members said interference fit prevents leakage of unpressurized fluid contained within the coupled assembly.

32. The combination of claim 1 wherein said inner member includes groove seated O-ring seal elements wherein the use of multiple seal elements provide further radial centering the axial alignment within the allowable desirble slidable tolerances between said inner and outer members.

33. The combination of claim 1 wherein said inner member includes groove seated O-ring seal elements wherein said grooves include configurations that secure said seal elements in a manner that permit a full radial swivel of said inner member within the outer member when the coupled assembly contains pressurized fluid without injury to said seal elements.

34. The combination of claim 1 wherein said inner member includes groove seated O-ring seal elements wherein said grooves include configurations that secure said seal elements in a manner that permits a sealed axial movement created by said column end force within the coupling assembly in a coupled state as pressurized fluid is introduced within the assembly.

* * * * *